US007429699B2

(12) United States Patent
Tajika

(10) Patent No.: US 7,429,699 B2
(45) Date of Patent: Sep. 30, 2008

(54) ELECTRONIC MUSICAL INSTRUMENT AND RECORDING MEDIUM THAT STORES PROCESSING PROGRAM FOR THE ELECTRONIC MUSICAL INSTRUMENT

(75) Inventor: Yoshinori Tajika, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/805,794

(22) Filed: May 24, 2007

(65) Prior Publication Data

US 2007/0289435 A1 Dec. 20, 2007

(30) Foreign Application Priority Data

Jun. 2, 2006 (JP) ............................ 2006-154605

(51) Int. Cl.
*G01P 3/00* (2006.01)
*G10H 1/02* (2006.01)
*G10H 7/00* (2006.01)

(52) U.S. Cl. ............................ 84/626; 84/601; 84/602; 84/615; 84/622; 84/719

(58) Field of Classification Search ....................... None
See application file for complete search history.

(56) References Cited

U.S. PATENT DOCUMENTS 5,741,995 A * 4/1998 Kawamura et al. ............ 84/721
6,376,759 B1 * 4/2002 Suzuki ........................ 84/615

FOREIGN PATENT DOCUMENTS

JP 2004-317615 A 11/2004

* cited by examiner

*Primary Examiner*—Marlon T Fletcher
(74) *Attorney, Agent, or Firm*—Frishauf, Holtz, Goodman & Chick, P.C.

(57) ABSTRACT

In an electronic musical instrument, when a musical tone delay time T1 read from a delay time table TBL depending on a velocity generated by a key being pressed has elapsed, a hammer string-striking sound is generated from musical tone waveform data selected in correspondence with the velocity. At the same time, when an impact delay time T2 read from the delay time table depending on the velocity has elapsed, a shelf board impulsive sound is generated from impact waveform data. The generated hammer string-striking sound and shelf board impulsive sound are added and outputted. As a result, a relationship between the shelf board impulsive sound and the hammer string-striking sound is simulated, and tone variations of an acoustic piano are reproduced.

6 Claims, 11 Drawing Sheets

ELECTRONIC MUSICAL INSTRUMENT AND RECORDING MEDIUM THAT STORES PROCESSING PROGRAM FOR THE ELECTRONIC MUSICAL INSTRUMENT

CROSS-REFERENCE TO RELATED APPLICATION

This application is based upon and claims the benefit of priority from the prior Japanese Patent Application No. 2006-154605, filed Jun. 2, 2006, the entire contents of which is incorporated herein by reference.

BACKGROUND OF THE INVENTION

1. Field of the Invention

The present invention relates to an electronic musical instrument that reproduces tone variations of an acoustic piano and a recording medium to which a processing program for the electronic musical instrument is stored.

2. Description of the Related Art

In recent years, various electronic musical instruments simulating the tone variations of an actual acoustic musical instrument have been developed. For example, a following technology used in an electronic musical instrument is disclosed in Japanese Patent Laid-open Publication No. 2004-317615.

In the disclosed electronic musical instrument, a string-striking impulsive sound and a string vibration tone are associated with each of a plurality of different strings and stored. The string-striking impulsive sound is generated when a string is struck. The string vibration tone follows the string-striking impulsive sound. The string-striking impulsive sound and the subsequent string vibration tone of the string to which a sound-producing operation is being performed are read, depending on the sound-producing operation. At the same time, the string vibration tones of other strings to which the sound-producing operation is not being performed are read. Through synthesis of the tones, a disparity in sound qualities (tone variation) between a direct sound and resonance is acquired. The direct sound is generated by the string to which the sound-producing operation is being performed. The resonance is emitted by the other strings to which the sound-producing operation is not being performed.

However, in the technology disclosed in the above-described patent publication, only the disparity in the sound qualities between the direct sound generated by the string to which the sound-producing operation is being performed and the resonance emitted by the other strings to which the sound-producing operation is not being performed is acquired. Therefore, the tone variation that occurs in an actual acoustic piano when a key is pressed cannot be reproduced.

SUMMARY OF THE INVENTION

The present invention has been made in light of the above-described issue. An object of the present invention is to provide an electronic musical instrument that can reproduce the tone variations of an acoustic piano and a recording medium to which a processing program for the electronic musical instrument is stored.

In accordance with an aspect of the present invention, there is provided an electronic musical instrument comprising: a delay time extracting means for storing a plurality of first delay times comprising a period that changes depending on a sounding volume and is a period after execution of a sound-producing instruction until generation of a string-striking sound and a plurality of second delay times comprising a period that changes depending on the sounding volume and is a period after execution of the sound-producing instruction until generation of a shelf board impulsive sound, and extracting a first delay time and a second delay time corresponding to a sounding volume specified by a sound-producing instruction operation from among the stored plurality of first delay times and second delay times; and a musical tone generating means for generating the string-striking sound having a pitch specified by the sound-producing instruction operation when the first delay time extracted by the delay time extracting means has elapsed after execution of the sound-producing instruction, generating the shelf board impulsive sound when the second delay time extracted by the delay time extracting means has elapsed, and generating a musical tone having a combination of the generated string-striking sound and the shelf board impulsive sound.

In accordance with another aspect of the present invention, there is provided an electronic musical instrument comprising: a delay characteristics storing means for storing a plurality of first delay times comprising a period that changes depending on a key-pressing strength and is a period after execution of a key press until generation of a string-striking sound and a plurality of second delay times comprising a period that changes depending on the key-pressing strength and is a period after pressing a key until generation of a shelf board impulsive sound; an extracting means for extracting a first delay time and a second delay time corresponding to a key-pressing strength generated by a key-pressing operation from the delay characteristics storing means; a string-striking sound generating means for generating the string-striking sound having a pitch depending on the key-pressing operation when the first delay time extracted by the extracting means has elapsed after pressing the key; a shelf board impulsive sound generating means for generating the shelf board impulsive sound when the second delay time extracted by the extracting means has elapsed after pressing the key; and a musical tone generating means for generating a musical tone having added thereto the string-striking sound generated by the string-striking sound generating means and the shelf board impulsive sound generated by the shelf board impulsive sound generating means.

In accordance with another aspect of the present invention, there is provided an electronic musical instrument comprising: a delay characteristics storing means for storing a plurality of types of delay characteristics having a plurality of first delay times comprising a period that changes depending on a key-pressing strength and is a period after execution of a key press until generation of a string-striking sound and a plurality of second delay times comprising a period that changes depending on the key-pressing strength and is a period after pressing the key until generation of a shelf board impulsive sound; a selecting means for selecting any of the plurality of types of delay characteristics stored in the delay characteristics storing means; an extracting means for extracting a first delay time and a second delay time corresponding to a key-pressing strength generated by a key-pressing operation from the delay characteristics storing means within the delay characteristics selected from the delay characteristics storing means by the selecting means; a string-striking sound generating means for generating the string-striking sound having a pitch depending on the key-pressing operation when the first delay time extracted by the extracting means has elapsed after pressing the key; a shelf board impulsive sound generating means for generating the shelf board impulsive sound when the second delay time extracted by the extracting means has elapsed after pressing the key; and a musical tone generating means for generating a musical tone having added thereto the string-striking sound generated by the string-striking sound generating means and the shelf board impulsive sound generated by the shelf board impulsive sound generating means.

In accordance with another aspect of the present invention, there is provided a computer program product for an electronic musical instrument stored on a computer-readable medium and executed by a computer, comprising the steps of: a delay time extracting process for storing a plurality of first delay times comprising a period that changes depending on a sounding volume and is a period after execution of a sound-producing instruction until generation of a string-striking sound and a plurality of second delay times comprising a period that changes depending on the sounding volume and is a period after execution of the sound-producing instruction until generation of a shelf board impulsive sound, and extracting a first delay time and a second delay time corresponding to a sounding volume specified by a sound-producing instruction operation from among the stored plurality of first delay times and second delay times; and a musical tone generating process for generating the string-striking sound having a pitch specified by the sound-producing instruction operation when the first delay time extracted by the delay time extracting means has elapsed after execution of the sound-producing instruction, generating the shelf board impulsive sound when the second delay time extracted by the delay time extracting process has elapsed, and generating a musical tone having a combination of the generated string-striking sound and the shelf board impulsive sound.

In accordance with another aspect of the present invention, there is provided a computer program product for an electronic musical instrument stored on a computer-readable medium and executed by a computer, comprising the steps of: an extracting process for storing a plurality of first delay times comprising a period that changes depending on a key-pressing strength and is a period after is a period after execution of a key press until generation of a string-striking sound and a plurality of second delay times comprising a period that changes depending on the key-pressing strength and is a period after pressing a key until generation of a shelf board impulsive sound, and extracting a first delay time and a second delay time corresponding to a key-pressing strength generated by a key-pressing operation from among the stored plurality of first delay times and second delay times; a string-striking sound generating process for generating the string-striking sound having a pitch depending on the key-pressing operation when the first delay time extracted by the extracting process has elapsed after pressing the key; a shelf board impulsive sound generating process for generating the shelf board impulsive sound when the second delay time extracted by the extracting process has elapsed after pressing the key; and a musical tone generating process for generating a musical tone having added thereto the string-striking sound generated by the string-striking sound generating process and the shelf board impulsive sound generated by the shelf board impulsive sound generating process.

In accordance with another aspect of the present invention, there is provided a computer program product for an electronic musical instrument stored on a computer-readable medium and executed by a computer, comprising the steps of: a selecting process for storing a plurality of types of delay characteristics having a plurality of first delay times comprising a period that changes depending on a key-pressing strength and is a period after execution of a key press until generation of a string-striking sound and a plurality of second delay times comprising a period that changes depending on the key-pressing strength and is a period after pressing the key until generation of a shelf board impulsive sound, and selecting any of the plurality of types of delay characteristics; an extracting process for extracting a first delay time and a second delay time corresponding to a key-pressing strength generated by a key-pressing operation from within the delay characteristics selected in the selecting process; a string-striking sound generating process for generating the string-striking sound having a pitch depending on the key-pressing operation when the first delay time extracted by the extracting process has elapsed after pressing the key; a shelf board impulsive sound generating process for generating the shelf board impulsive sound when the second delay time extracted by the extracting process has elapsed after pressing the key; and a musical tone generating process for generating a musical tone having added thereto the string-striking sound generated by the string-striking sound generating process and the shelf board impulsive sound generated by the shelf board impulsive sound generating process.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

After a principle of the present invention is described, embodiments based on the invention principle will be described.

A. Principle of the Present Invention

Figure 1:
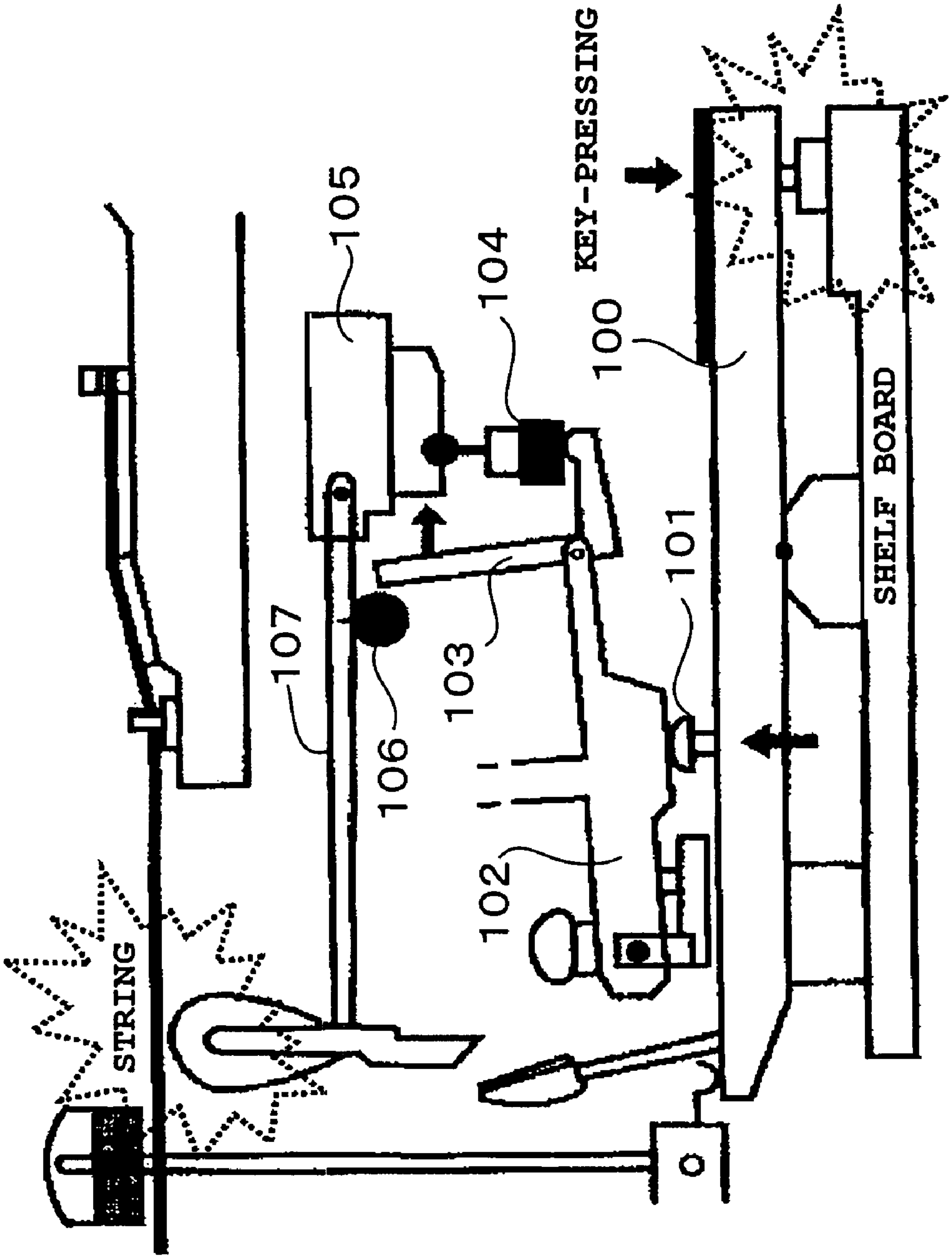
FIG. 1 is a schematic diagram of an overview of an action mechanism of an acoustic piano.

FIG. 1 is a diagram explaining a principle of the present invention. FIG. 1 is a schematic diagram of an overview of an action mechanism of an acoustic piano. As is commonly known, the action mechanism includes a key 100, a capstan screw 101, a wippen 102, a jack 103, and a hammer shank 107, as shown in FIG. 1. The key 100 vibrates depending on a key-pressing operation. The capstan screw 101 rises as a result of the vibration of the key 100. The wippen 102 rotates as a result of the rising of the capstan screw 101. The jack 103 rotates and rises with the wippen 102 until the jack 103 comes into contact with a set-off button 104. The hammer shank 107 is pressed upwards by the jack 103, via a hammer roller 106, and rotates against a shank flange 105. A hammer felt strikes a string as a result of the rotation of the hammer shank 107.

The acoustic piano including an action mechanism such as that described above generates a hammer string-striking sound as a result of the hammer striking a piano string in the above-described configuration. In addition, the acoustic piano generates a secondary noise when the key 100 strikes a shelf board during key-pressing (hereinafter, referred to as a shelf board impulsive sound). The shelf board impulsive sound seems to be a sound that can be ignored, compared to the hammer string-striking sound. However, the shelf board impulsive sound is a significant factor in characterizing the tone variations of the piano.

Figure 2:
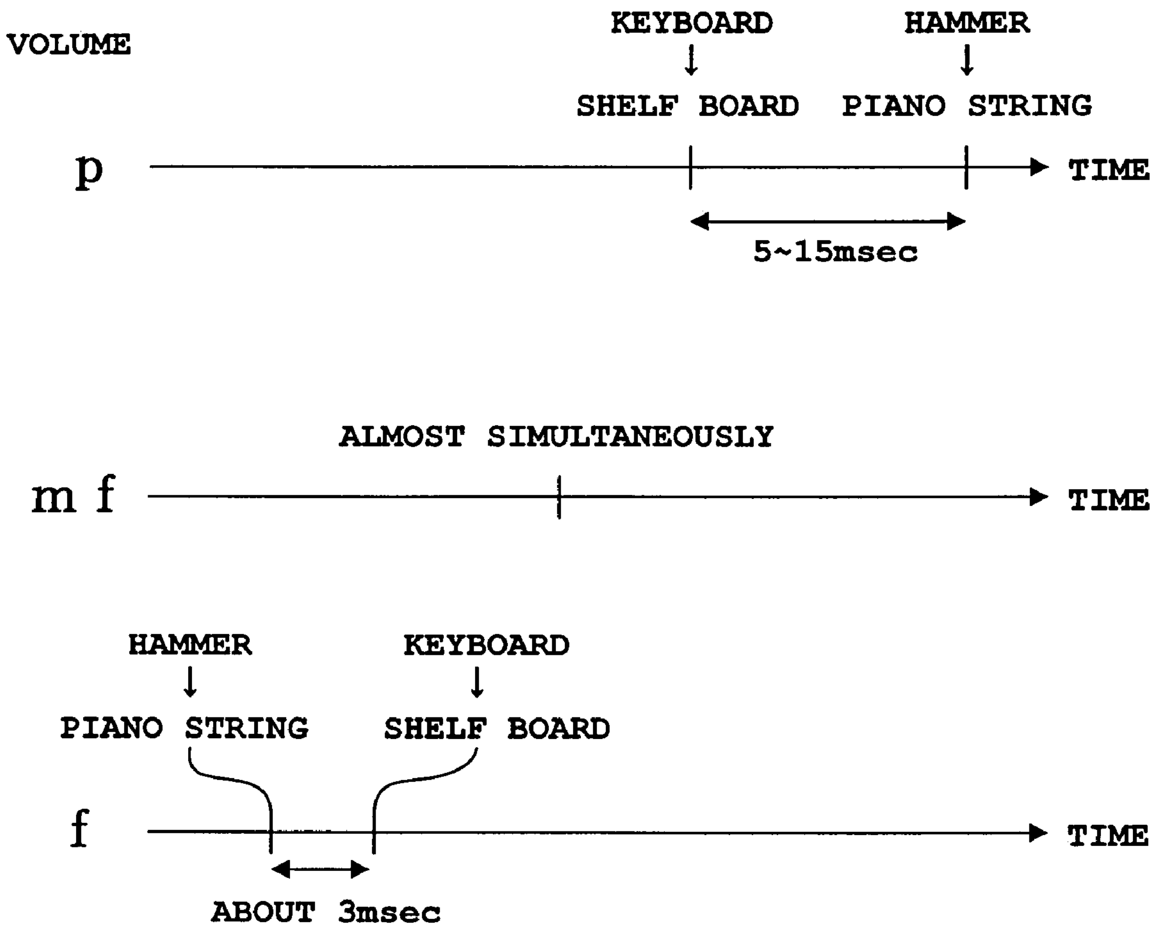
FIG. 2 is a diagram explaining an overview of the present invention.

The shelf board impulsive sound is a factor characterizing the tone variations of the piano because the period of time during which the shelf board impulsive sound is generated is dependent on the key-pressing strength (sounding volume) and changes depending on the key-pressing strength. As shown in FIG. 2, in the actual acoustic piano, when the key-pressing strength is weak (for example, when the sounding volume is piano p), the timing at which the lower part of the key 100 strikes the shelf board precedes the timing at which the hammer strikes the string. As a result, the shelf board impulsive sound is not easily masked by the hammer string-striking sound. The presence of the shelf board impulsive sound becomes conspicuous.

When the key-pressing strength is moderate (for example, when the sounding volume is mezzo forte mf), the timing at which the hammer strikes the string and the timing at which the lower part of the key 100 strikes the shelf board are almost simultaneous. When the key-pressing strength is strong (for example, when the sounding volume is forte f), the lower part of the key 100 strikes the shelf board after the hammer strikes the string. Therefore, the shelf board impulsive sound is masked by the hammer string-striking sound. According to the present invention, the relationship between the shelf board impulsive sound and the hammer string-striking sound, such as that described above, is simulated, and the tone variations of the acoustic piano are reproduced.

B. First Embodiment

B-1. Configuration

Figure 3:
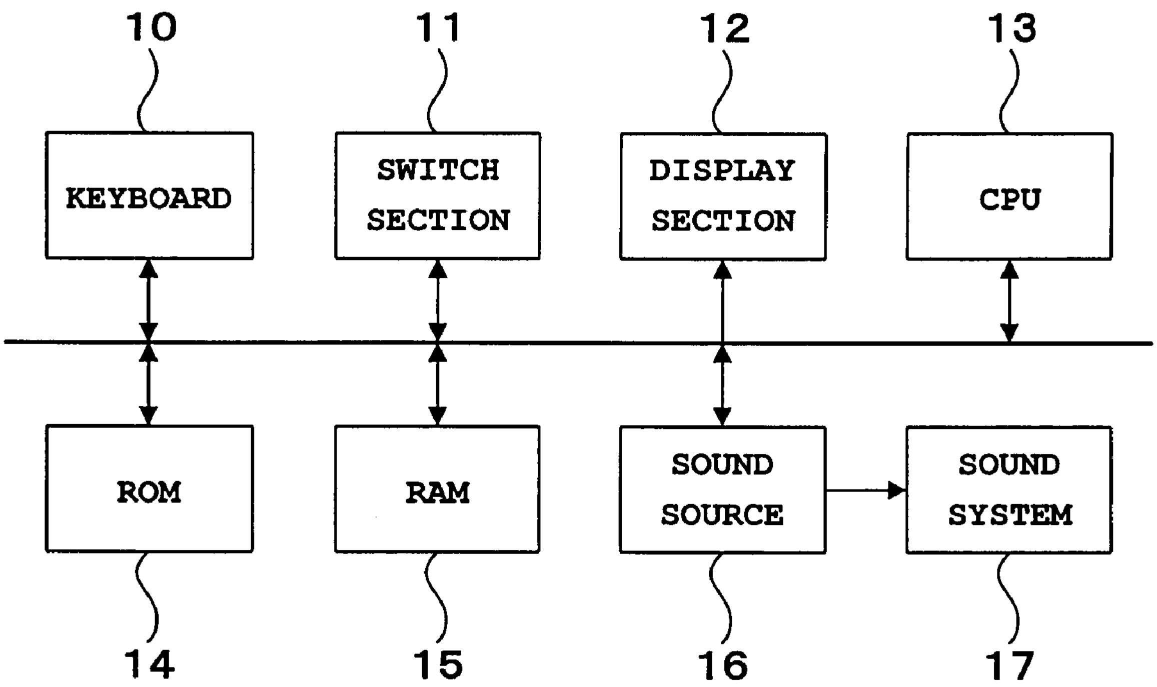
FIG. 3 is a block diagram of a configuration according to a first embodiment.

FIG. 3 is a block diagram of an overall configuration of the electronic musical instrument according to a first embodiment of the present invention. A keyboard 10 generates performance information including a key-ON/key-OFF event, a key number, and a velocity (key-pressing strength) depending on a key-pressing/releasing operation (performance operation). A switch section 11 includes various operation switches disposed on a musical instrument panel. The switch section 11 generates a switch event corresponding with the type of switch that is being operated. A display section 12 includes a liquid crystal display (LCD) panel or the like. The display section 12 displays a setting state, an operation mode, and the like of each section of the musical instrument, depending on display control signals provided by a central processing unit (CPU) 13.

The CPU 13 sets the operation state of each section of the musical instrument based on the switch event provided by the switch section 11. The CPU 13 also generates a command (for example, a note-ON command indicating sounding or a note-OFF command indicating muting), depending on the performance information provided by the keyboard 10, and sends the command to a sound source 16. Processes performed by the CPU 13 according to the scope of the present invention will be described hereafter. A read-only memory (ROM) 14 includes a program area and a data area. The program area of the ROM 14 stores various control programs run by the CPU 13. A main routine, described hereafter, is included in the various control programs.

Figure 4:
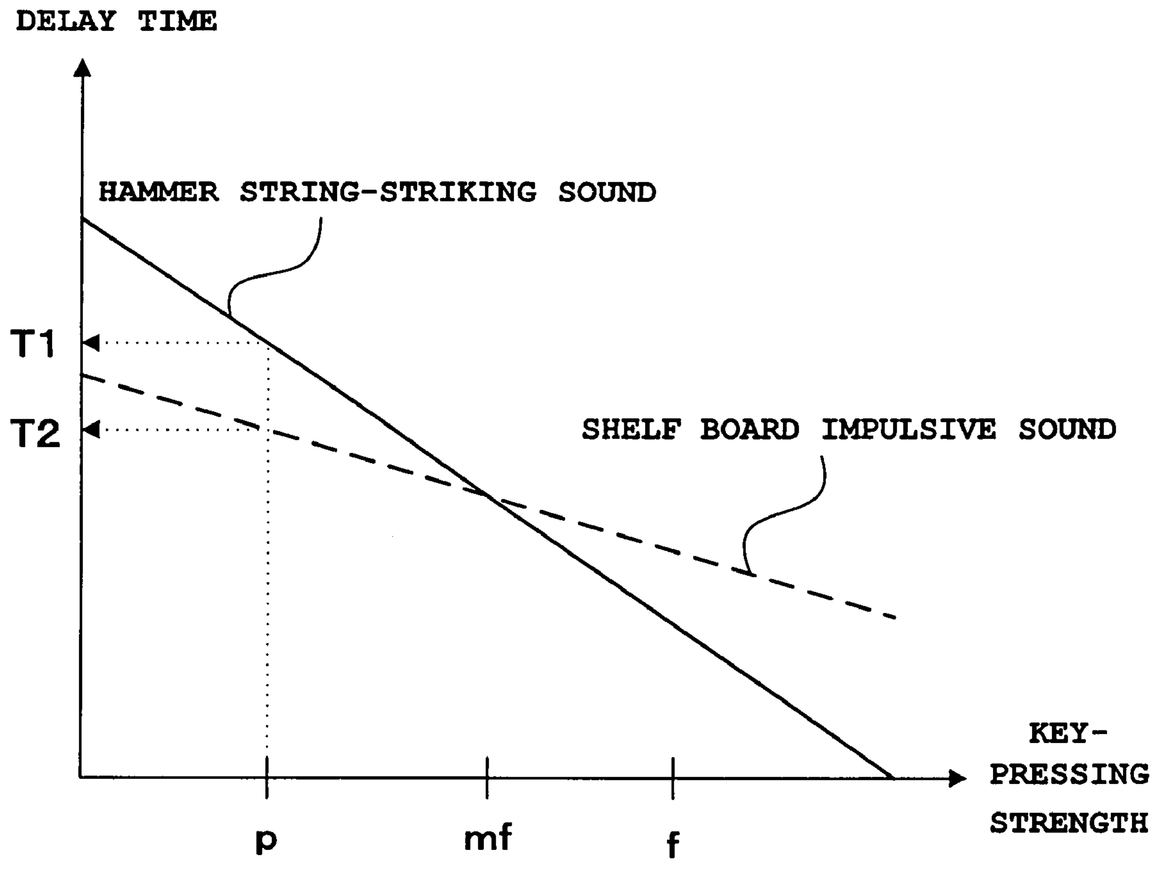
FIG. 4 is a diagram of an example of delay characteristics of a delay time table TBL.

The data area of the ROM 14 stores a delay time table TBL. The delay time table TBL is used to simulate the relationship between the shelf board impulsive sound and the hammer string-striking sound. Specifically, as shown in FIG. 4, a musical tone delay time T1 and an impact delay time T2 are read from the delay time table TBL, depending on the key-striking strength (velocity). The musical tone delay time T1 is the period from when the key-pressing is started to when the hammer string-striking sound is actually generated. The impact delay time T2 is the period from when the key-pressing is started to when the shelf board impulsive sound is actually generated.

Therefore, as explained in the principle of the present invention, when the key-pressing strength is weak (for example when the sounding volume is piano p), the timing at which the lower part of the key 100 strikes the shelf board precedes the timing at which the hammer strikes the string. Therefore, the relationship between the musical tone delay time T1 and the impact delay time T2 read from the delay time table TBL is T1>T2. When the key-pressing strength is moderate (for example, when the sounding volume is mezzo forte mf), the timing at which the hammer strikes the string and the timing at which the lower part of the key 100 strikes the shelf board are almost simultaneous. Therefore, the relationship between the musical tone delay time T1 and the impact delay time T2 read from the delay time table TBL is T1=T2. When the key-pressing strength is strong (for example, when the sounding volume is forte f), the lower part of the key 100 strikes the shelf board after the hammer strikes the string. Therefore, the relationship between the musical tone delay time T1 and the impact delay time T2 read from the delay time table TBL is T1<T2.

Next, the description of the configuration according to the embodiment will be resumed, with reference to FIG. 1. A Random Access Memory (RAM) 15 is provided as a work area of the CPU 13 and temporarily stores various register and flag data. A sound source 16 is configured using a known-waveform memory reading system. The waveform memory included within the sound source 16 stores a plurality of types of musical tone waveform data corresponding to the velocity. The musical tone waveform data generates the hammer string-striking sound. In addition, the waveform memory stores impact waveform data generating the shelf board impulsive sound.

The sound source 16 generates the hammer string-striking sound from the musical tone waveform data selected in correspondence with the velocity, when the musical tone delay time T1 has elapsed. The musical tone delay time T1 is read from the delay time table TBL depending on the velocity provided by the CPU. At the same time, the sound source 16 generates the shelf board impulsive sound from the impact waveform data, when the impact delay time T2 has elapsed. The impact delay time T2 is read from the delay time table TBL depending on the velocity. The sound source 16 adds the generated hammer string-striking sound and shelf board impulsive sound and outputs the added hammer string-striking sound and shelf board impulsive sound. Processes performed by the sound source 16 according to the scope of the present invention will be described hereafter. After converting the output from the sound source 16 to an analog waveform signal, a sound system 17 performs filtering. The filtering is, for example, the removal of unnecessary noise from the analog waveform signal. The sound source 16 amplifies the level and sounds the analog waveform signal from a speaker.

B-2. Operations

Next, operations of the configuration according to the first embodiment will be described, with reference to FIG. 5 to FIG. 8. Hereafter, after operations of the main routine performed by the CPU 13 are described, the operations of a sound source process performed by the sound source 16 will be described.

(1) Operations of the Main Routine

Figure 5:
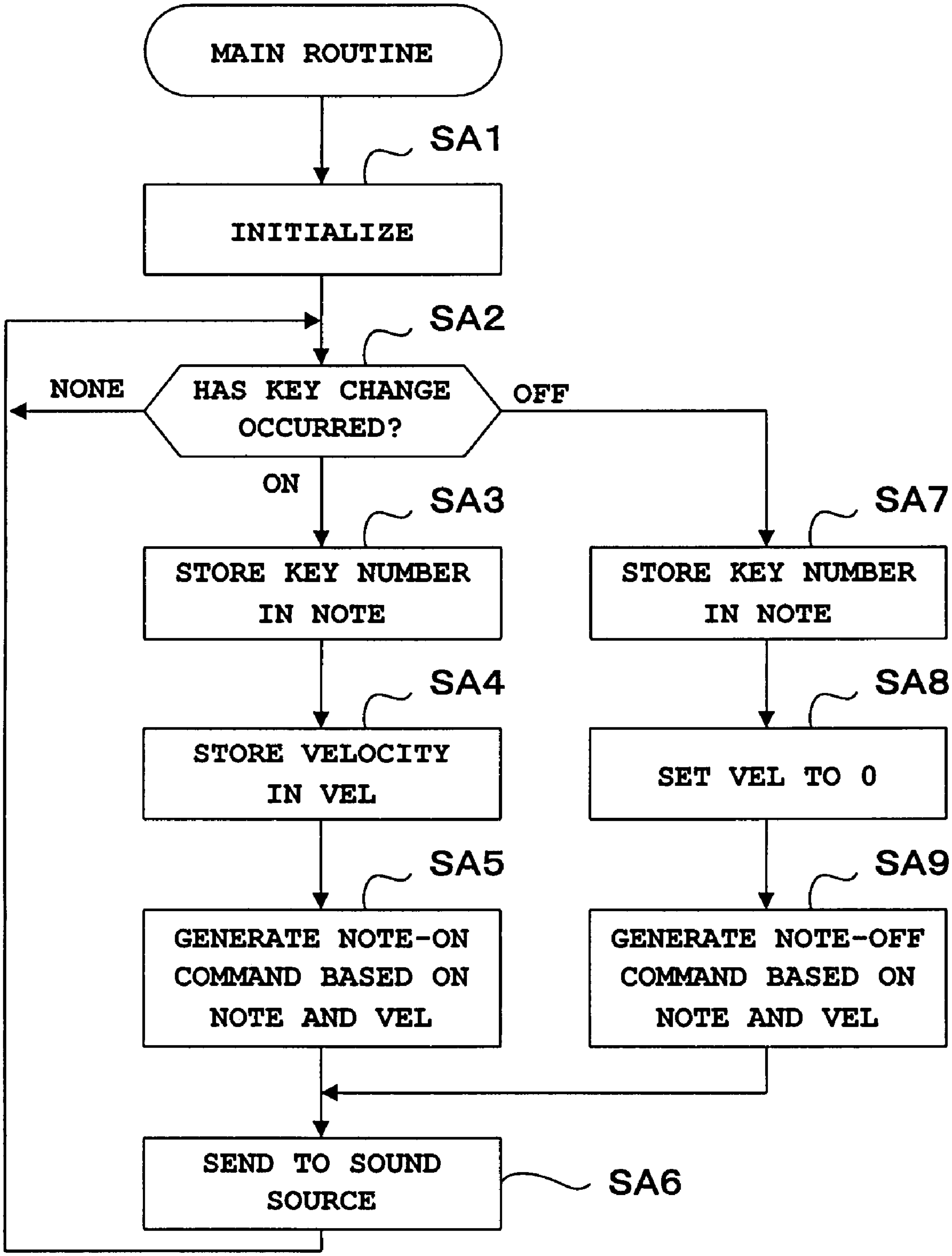
FIG. 5 is an operational flowchart of a main routine.

When the power is turned ON by a power switch operation, the CPU 13 performs the main routine shown in FIG. 5 and proceeds to Step SA1. The CPU 13 performs initialization, such as resetting the various registers and flags stored in the RAM 15 and setting initial values. After initialization is completed, the CPU 13 proceeds to Step SA2 and judges whether a key change has occurred based on the performance information generated by the keyboard 10.

When a key operation has not been performed and no key change has occurred in the keyboard 10, the CPU 13 repeats the key change judgment at Step SA2. For example, one of the keys on the keyboard 10 is pressed and the key-ON event is generated. Then, the CPU 13 proceeds to Step SA3. The CPU 13 stores a key number in a register NOTE. The key number is included within the performance information generated depending on the key-pressing operation. Next, at Step SA4, the CPU 13 stores the velocity in a register VEL. The velocity is included within the performance information generated depending on the key-pressing operation. Subsequently, at Step SA5, the CPU 13 generates a note-ON command based on the key number stored in the register NOTE and the velocity stored in the register VEL. Next, at Step SA6, after sending the generated note-ON command to the sound source 16, the CPU 13 returns to Step SA2.

For example, one of the keys that are being pressed is released, and the key-OFF event is generated. The CPU 13 proceeds to Step SA7 and stores the key number in the register NOTE. The key number is included within the performance information generated according to the key-release operation. Next, at Step SA8, the CPU 13 resets the register VEL to zero. Then, at Step SA9, the CPU 13 generates a note-OFF command based on the key number of the key that has been released in the register NOTE and the register VEL that has been reset to zero. The CPU proceeds to SA6. After sending the generated note-OFF command to the sound source 16, the CPU 13 returns to Step SA2 and returns to a state for judging key changes.

(2) Operations of the Sound Source Process

Figure 6:
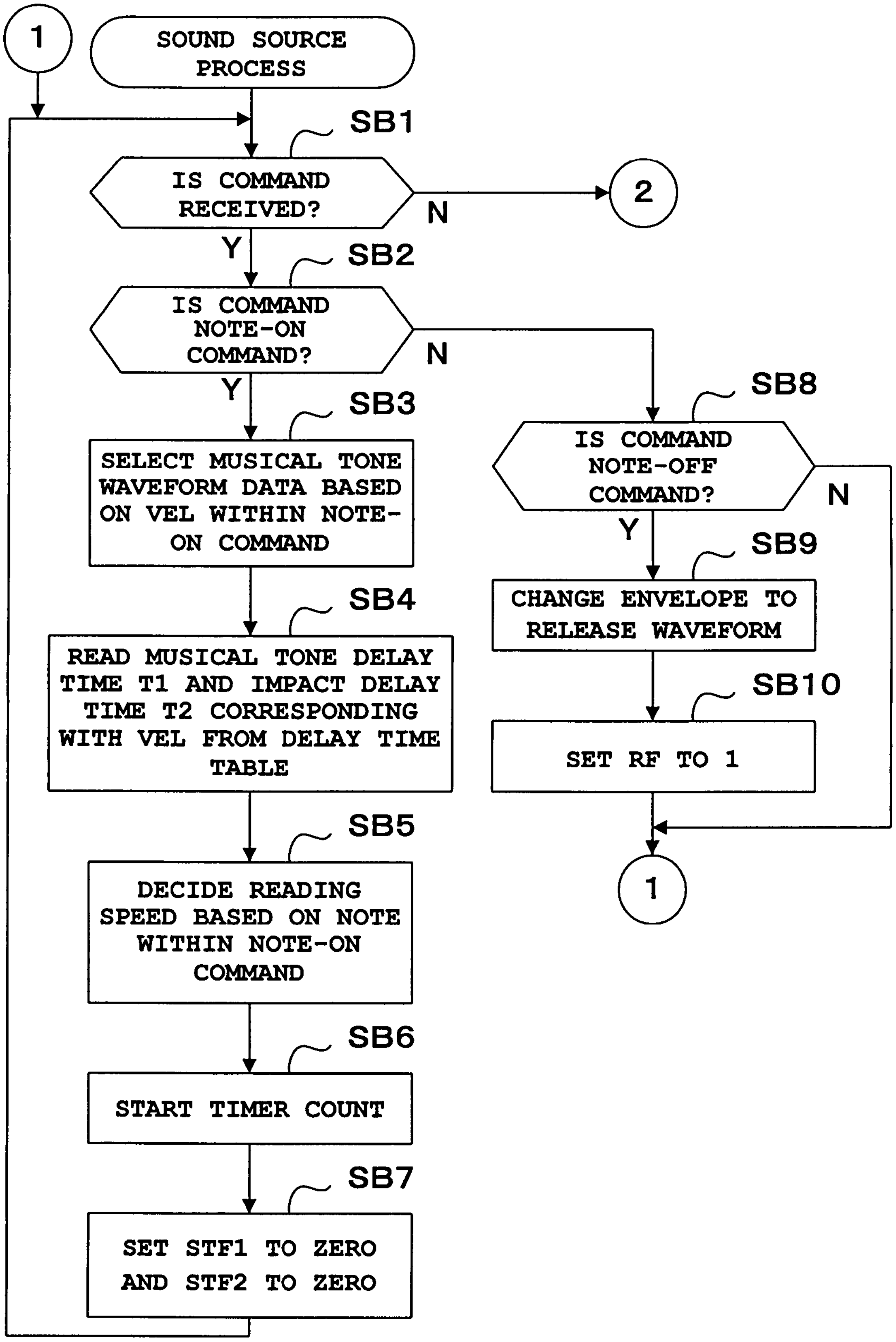
FIG. 6 is an operational flowchart of a sound source process.
Figure 7:
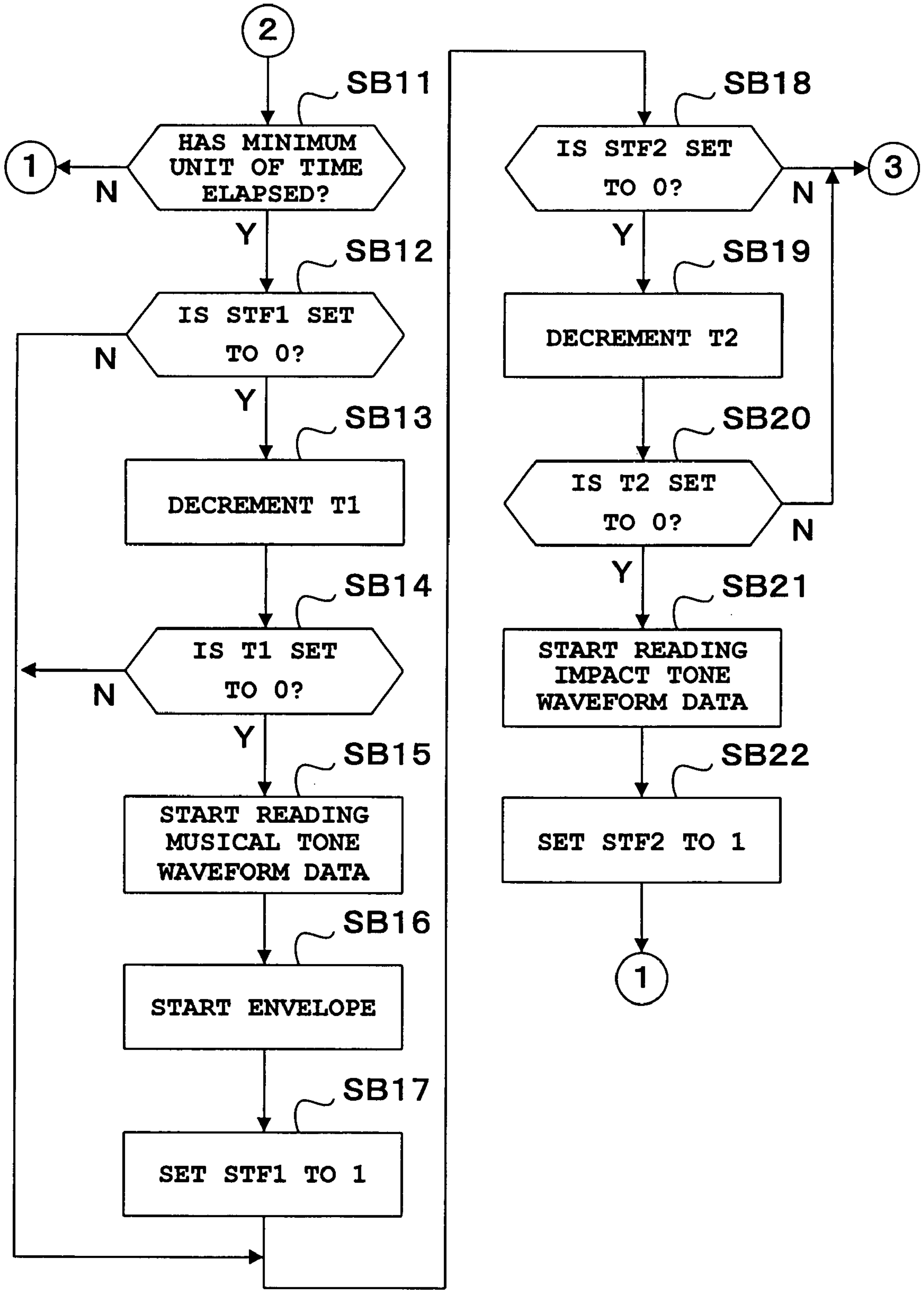
FIG. 7 is an operational flowchart of a sound source process.
Figure 8:
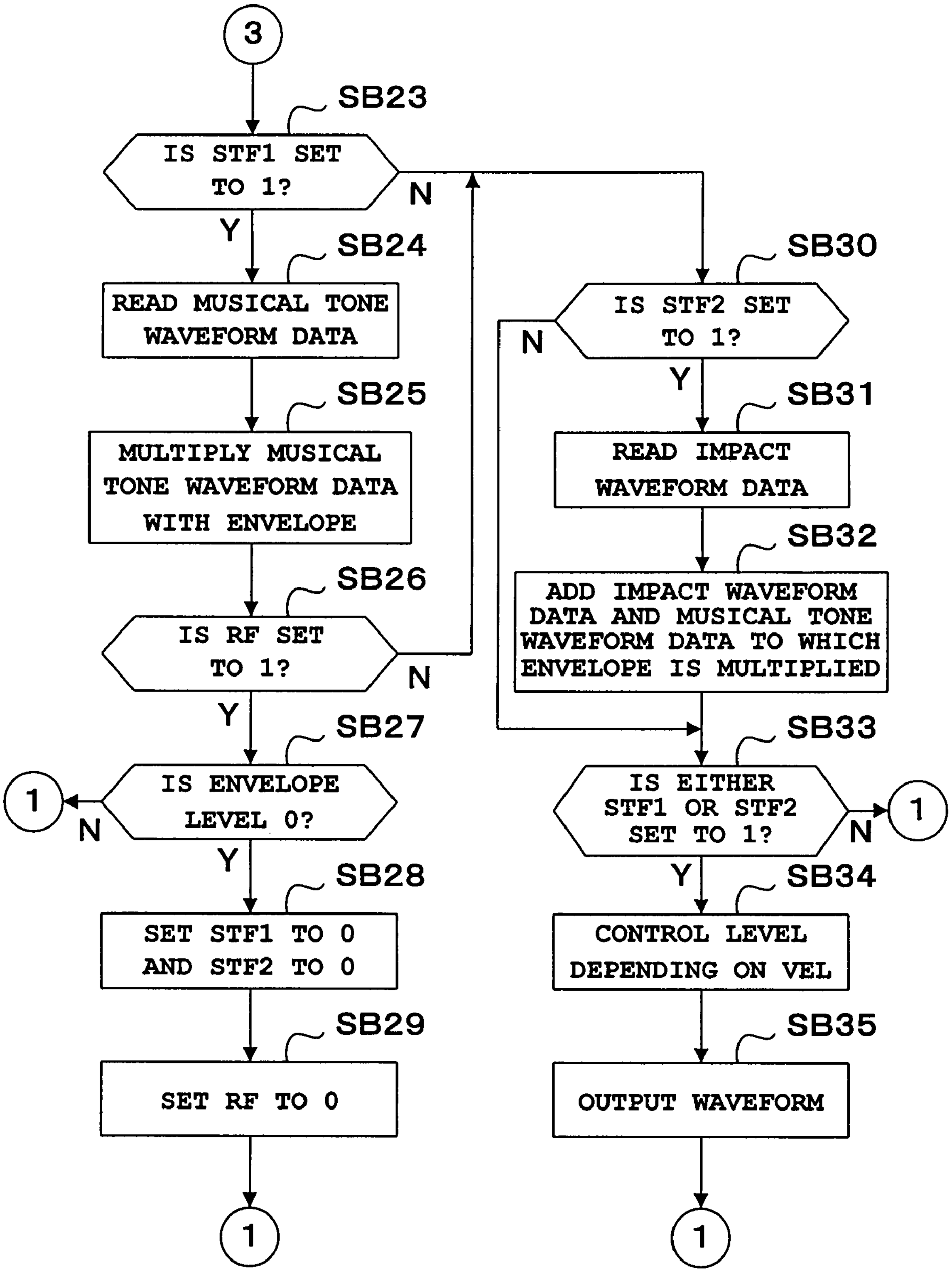
FIG. 8 is an operational flowchart of a sound source process.

Next, operations of the sound source process performed by the sound source 16 will be described, with reference to FIG. 6 to FIG. 8. The sound source 16 performs the sound source process shown in FIG. 6 depending on the power being turned ON and proceeds to Step SB1. The sound source 16 judges whether the command is received. Hereafter, operations divided into when the command is received from the CPU 13 and when the command is not received from the CPU 13 are described.

<When Command is Received>

When the command is received from the CPU 13, the judgment result at Step SB1 is "YES". The sound source 16 proceeds to Step SB2. At Step SB2, the sound source 16 judges whether the command is the note-ON command.

a. When Note-ON Command is Received

When the note-ON command is received, the judgment result at Step SB2 is "YES". The sound source 16 proceeds to Step SB3. At Step SB3, the sound source 16 selects the musical tone waveform data corresponding with the velocity VEL within the note-ON command received from the CPU 13. Next, at Step SB4, the sound source 16 reads the musical tone delay time T1 and the impact delay time T2 from the delay time table TBL stored in the data area of the ROM 14, depending on the velocity VEL within the note-ON command received from the CPU 13. As described earlier, the musical note delay time T1 indicates the period from when the key-pressing is started to when the hammer string-striking sound is actually generated. At the same time, the impact delay time T2 indicates the period from when the key-pressing is started to when the shelf board impulsive sound is actually generated.

Next, at Step SB5, the sound source 16 decides a reading speed of the musical tone waveform data selected at Step SB3, based on the key number NOTE within the note-ON command received from the CPU 13. Then, the sound source 16 proceeds to Step SB6 and starts a timer count. As a result, the sound source 16 performs a timer interrupt process (not shown) and generates a timer clock. Next, at Step SB7, the sound source 16 respectively resets a flag STF1 and a flag STF2 to zero and returns to Step SB1.

The flag STF1 being set to "1" indicates a state in which the musical tone waveform data is being read (hereinafter, referred to as a musical tone waveform data reading state). The flag STF1 being set to "0" indicates a state in which the reading of the musical tone waveform data is stopped (hereinafter, referred to as a musical tone waveform reading stopped state). The flag STF2 being set to "1" indicates a state in which the impact waveform data is being read (hereinafter, referred to as the impact waveform data reading state). The flag STF2 being set to "0" indicates a state in which the reading of the impact waveform data is stopped (hereinafter, referred to as a impact waveform data reading stopped state).

b. When Note-OFF Command is Received

When the note-OFF command is received, the judgment result at Step SB8 is "YES". The sound source 16 proceeds to Step SB9. At Step SB9, the sound source 16 changes an envelope to be multiplied with the musical tone being generated to a release waveform. Next, the sound source 16 proceeds to Step SB10. The sound source 16 sets a flag RF to "1", indicating a released state. Then, the sound source 16 returns to Step SB1.

<When Command is Not Received>

At the same time, when the command is not received from the CPU 13, the judgment result at Step SB1 is "NO". The sound source 16 proceeds to Step SB11 shown in FIG. 7. At Step SB11, the sound source 16 judges whether a minimum unit of time has elapsed. The minimum unit of time indicates a period of one timer clock cycle. When the minimum unit of time has not elapsed, the judgment result at Step SB 11 is "NO". The sound source 16 returns to Step SB1 shown in FIG. 6.

On the other hand, when the minimum unit of time has elapsed, the judgment result at Step SB11 is "YES". The sound source 16 proceeds to Step SB12. At Step SB12, the sound source 16 judges whether the flag STF1 is set to "0" or, in other words, a musical tone waveform data reading stopped state. When the musical tone waveform data reading state is set (when flag STF1 is "1"), the judgment result is "NO". The sound source 16 proceeds to Step SB18, described hereafter.

At the same time, when the musical tone waveform data reading stopped state is set, the judgment result at Step SB12 is "YES". The sound source 16 proceeds to Step SB13. At Step SB13, the sound source 16 decrements the musical tone delay time T1 read from the delay time table TBL at Step SB4, described earlier (see FIG. 6). Next, at Step SB14, the sound source 16 judges whether the decremented musical tone delay time is "0" or whether the sounding timing of the hammer string-striking sound is reached. If the sounding timing of the hammer string-striking time is not reached, the judgment result is "NO". The sound source 16 proceeds to Step SB18, described hereafter.

On the other hand, when the sounding timing of the hammer string-striking sound is reached, the judgment result at Step SB14 is "YES". The sound source 16 proceeds to Step SB15 and starts reading the musical tone waveform data. At Step SB16, the sound source 16 starts the envelope waveform to be multiplied to the read musical tone waveform data. A known ADSR control is performed on the envelope waveform. Then, at Step SB17, the sound source 16 sets the flag STF1 to "1" and sets the flag STF1 to the musical tone waveform data reading state.

Next, the sound source 16 proceeds to Step SB18. The sound source 16 judges whether the flag STF2 is set to "0" or, in other words, the impact tone waveform data reading stopped state. When the impact tone waveform data reading stopped state is set, the judgment result is "YES". The sound source 16 proceeds to Step SB19. At Step SB19, the sound source 16 decrements the impact delay time T2 read from the delay time table TBL at Step SB4, described earlier (see FIG. 6). Next, at Step SB20, the sound source 16 judges whether the decremented impact delay time T2 is set to "0" or, in other words, whether the sounding timing of the shelf board impulsive sound is reached. When the sounding timing of the shelf board impulsive sound is not reached, the judgment result is "NO". The sound source 16 proceeds to Step SB23, described hereafter (see FIG. 8).

At the same time, when the impact delay time T2 has elapsed and the sounding timing of the shelf board impulsive sound is reached, the judgment result at Step SB20 is "YES". The sound source 16 proceeds to Step SB21 and starts reading the impact waveform data. Then, at Step SB22, the sound source 16 sets the flag STF2 to "1" and sets the flag STF2 to the impact waveform data reading state. The sound source 16 returns to Step SB1, described earlier (see FIG. 6).

When the flag STF2 is set to the impact waveform data reading state (when the flag STF2 is set to "1"), the judgment result at Step SB18 is "NO". The sound source 16 proceeds to Step SB23, shown in FIG. 8. At Step SB23, the sound source 16 judges whether the flag STF1 is set to the musical tone waveform data reading state (whether the flag STF1 is set to "1"). When the flag STF1 is in the musical tone waveform data reading state, the judgment result is "YES". The sound source 16 proceeds to Step SB24 and starts reading the musical tone waveform data. Next, at Step SB25, the sound source 16 multiplies the read musical tone waveform data with the envelope waveform.

Then, at Step SB26, the sound source 16 judges whether the flag RF is set to "1" or, in other words, whether the flag RF is set to the release state by the note-OFF command. When the flag RF is not set to the release state, the judgment result is "NO". The sound source 16 proceeds to Step SB30, described hereafter. At the same time, when the flag RF is set to the release state, the judgment result is "YES". The sound source 16 proceeds to Step SB27.

At Step SB27, the sound source 16 judges whether an envelope level in the release state has reached "0". When the envelope level has not reached "0", the judgment result is "NO". The sound source 16 returns to Step SB1, described earlier (see FIG. 6). At the same time, when the envelope level has reached "0", the judgment result is "YES". The sound source 16 proceeds to Step SB28. At Step S28 to Step SB29, the sound source 16 respectively resets the flag STF1, the flag STF2, and the flag RF to zero. The sound source 16 returns to Step SB1, described earlier (see FIG. 6).

On the other hand, when the flag STF1 is set to the musical tone waveform reading stopped state (when the flag STF1 is set to "0"), the judgment result at Step SB23 is "YES". The sound source 16 proceeds to Step SB30. At Step SB30, the sound source 16 judges whether the flag STF2 is set to the impact waveform data reading state (whether the flag STF2 is set to "1"). When the flag STF2 is set to the impact waveform data reading stopped state, the judgment result is "NO". The sound source 16 proceeds to Step SB33, described hereafter.

At the same time, when the flag STF2 is set to the impact waveform data reading state, the judgment result at Step SB30 is "YES". The sound source 16 proceeds to Step SB31 and starts reading the impact waveform data. Next, at Step SB32, the sound source 16 adds the read impact waveform data and the musical tone waveform data to which envelope multiplication has been performed at Step SB25. Then, the sound source 16 proceeds to Step SB33. The sound source 16 judges whether either of the flag STF1 or the flag STF2 is set to "1" or, in other words, whether either the musical tone waveform data or the impact waveform data is in the reading state.

When the musical tone waveform data and the impact waveform data are both in the reading stopped state, the judgment result is "NO". The sound source 16 returns to Step SB1, shown in FIG. 6. On the other hand, when either the musical tone waveform data or the impact waveform data is in the reading state, the judgment result at Step SB33 is "YES". The sound source 16 proceeds to Step SB34. At Step SB34, the sound source 16 controls the level of the added waveform added at Step SB32, depending on the velocity VEL. Next, at Step SB35, after the level-controlled added waveform is outputted to the sound system 17, the sound source 16 returns to Step SB1 shown in FIG. 6.

As described above, according to the present embodiment, when the musical tone delay time T1 read from the delay time table TBL depending on the velocity has elapsed, the sound source 16 generates the hammer string-striking sound from the musical tone waveform data selected in correspondence with the velocity. At the same time, when the impact delay time T2 read from the relay time table TBL depending on the velocity has elapsed, the sound source 16 generates the shelf board impulsive sound from the impact waveform data. The sound source 16 adds the generated hammer string-striking sound and shelf board impulsive sound and outputs the added hammer string-striking sound and shelf board impulsive sound. As a result, the relationship between the shelf board impulsive sound and the hammer string-striking sound can be simulated, and the tone variations of the acoustic piano can be actualized.

C. Second Embodiment

Next, a second embodiment will be described with reference to FIG. 9 to FIG. 11. The second embodiment differs from the first embodiment, described above, in that a plurality of delay time tables TBL having different delay characteristics are provided in the data area of the ROM 14. The user can select the delay time table to be used to form the musical tone, as desired, from among the delay time tables TBL.

Figure 9:
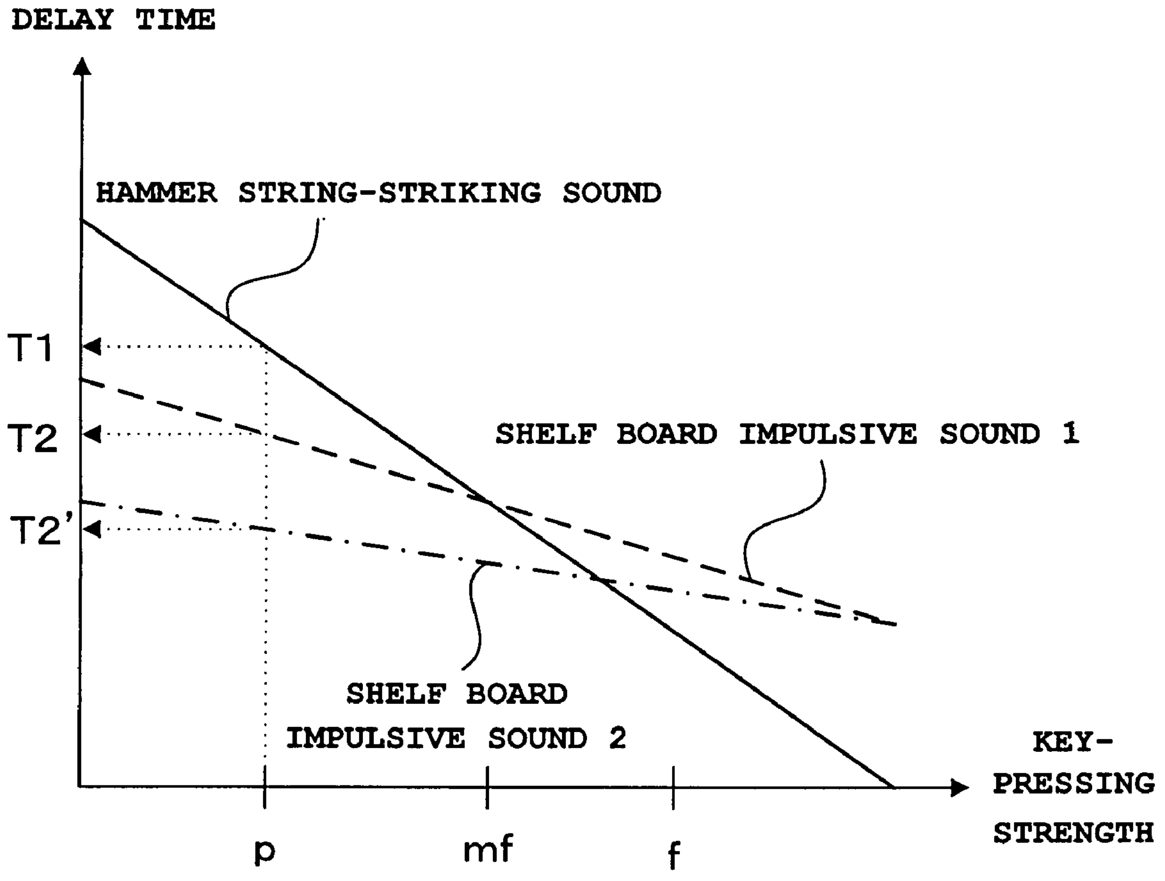
FIG. 9 is a diagram of an example of display time tables TBL according to a second embodiment.

An example of the delay time tables TBL according to the second embodiment is shown in FIG. 9. In FIG. 9, a first delay time table TBL and a second delay time table TBL are overlapped and shown as one table. The first delay time table TBL includes the delay characteristics of the hammer string-striking sound for reading the musical tone delay time T1 and the delay characteristics of the shelf board impulsive sound for reading the impact delay time T2. The second delay time table TBL includes the delay characteristics of the hammer string-striking sound for reading the musical tone delay time T1 and the delay characteristics of the shelf board impulsive sound for reading the impact delay time T2'.

According to the second embodiment, the switch section 11 includes a time setting switch used to select one of the delay time tables TBL. Depending on the operation of the time setting switch, a time setting switch process in which the CPU 13 selects the delay time table TBL is provided between the Step SA1 and the Step SA2, within the main routine (see FIG. 5) according to the first embodiment, described above. FIG. 10 is a flowchart of the operations of the time setting switch process according to the second embodiment.

Figure 10:
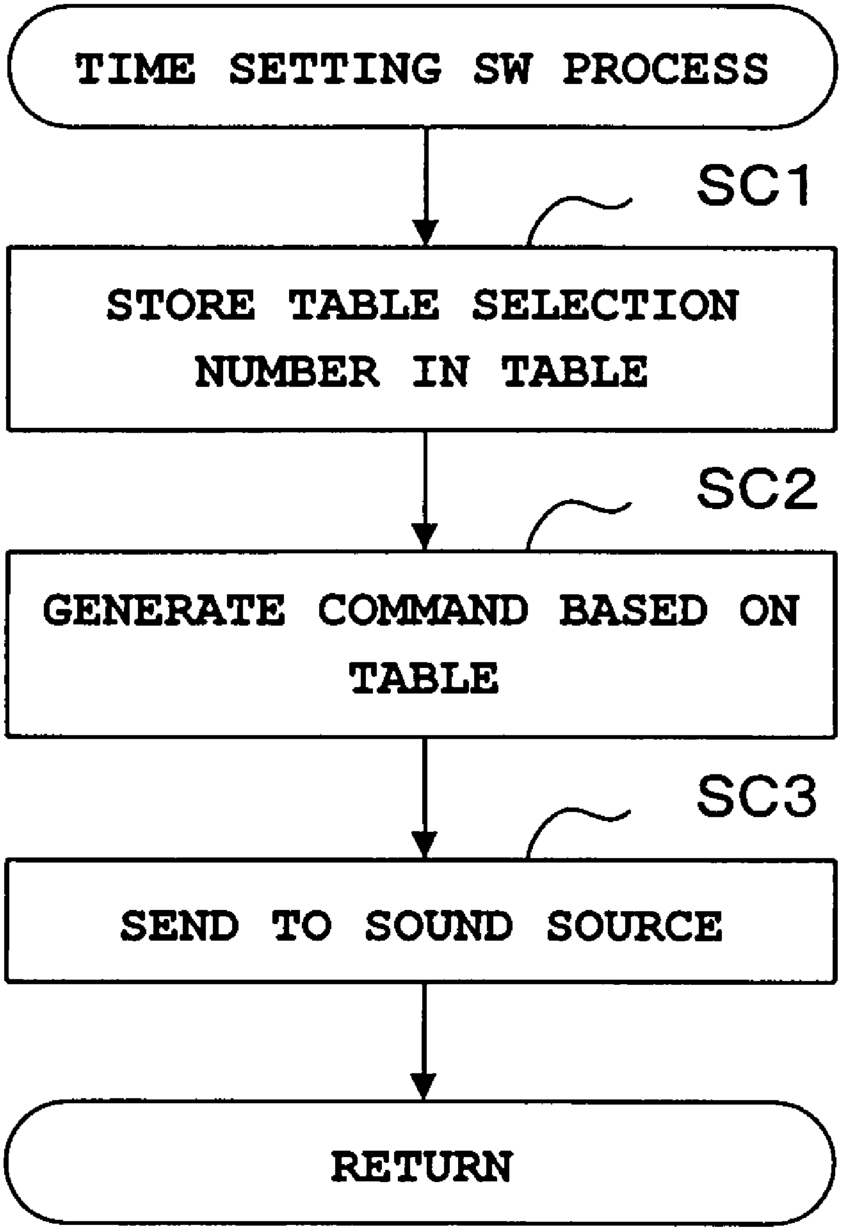
FIG. 10 is an operational flowchart of a time setting switch process according to the second embodiment.

As shown in the diagram, when the present process is called from the main routine depending on the operation of the time setting switch, the CPU 13 proceeds to Step SC1, shown in FIG. 10. The CPU 13 stores a table selection number in the register TABLE. The table selection number is set by an operation of the time setting switch. Next, at Step SC2, the CPU 13 generates a table command including the table selection number stored in the register TABLE. At the subsequent Step SC3, the CPU 13 sends the generated table command to the sound source 16 and completes the present process.

Figure 11:
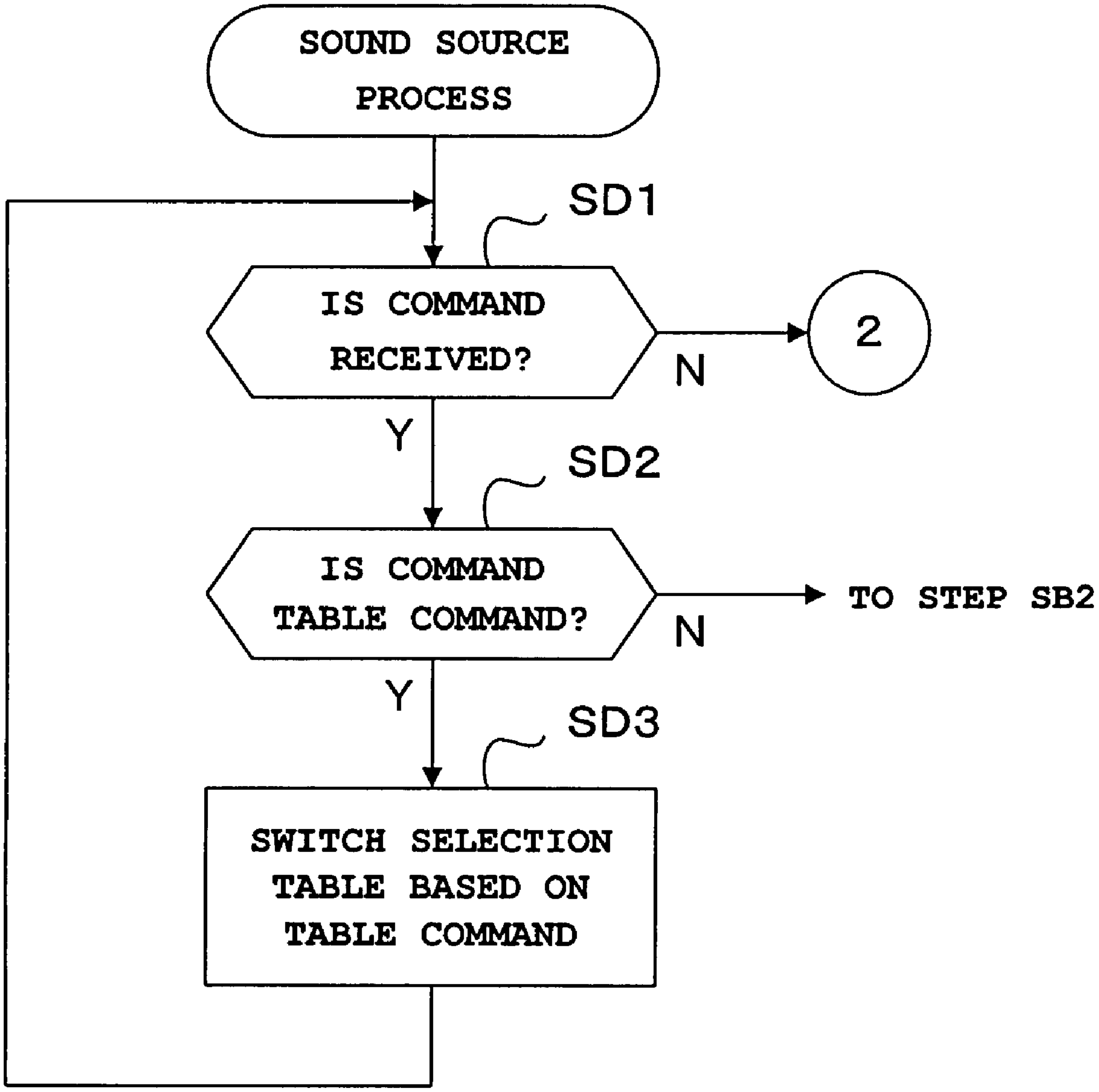
FIG. 11 is an operational flowchart of a sound source process according to the second embodiment.

At the same time, the sound source 16 performs the sound source process shown in FIG. 11. As according to the first embodiment, the sound source 16 first proceeds to Step SD1 and judges whether the command is received. When the command is not received from the CPU 13, the judgment result at Step SD1 is "NO". As according to the first embodiment, the sound source 16 performs the processes at Step SB11 and subsequent steps, shown in FIG. 7. On the other hand, when the command from the CPU 13 is received, the judgment result at Step SD1 is "YES". The sound source 16 proceeds to Step SD2.

At Step SD2, the sound source 16 judges whether the command received from the CPU 13 is the table command. When the received command is not the table command, the judgment result is "NO". The sound source 16 proceeds to Step SB2 of the first embodiment (see FIG. 6). When the received command is the table command, the judgment result is "YES". The sound source 16 proceeds to Step SD3. At Step SD3, after the delay time table TBL to be used is specified in adherence to the table selection number included in the received table command, the sound source 16 returns to Step SD1. As a result, the sound source 16 uses the specified delay time table TBL and reads the musical tone delay time T1 and the impact delay time T2 corresponding with the velocity VEL at Step SB4 (see FIG. 6), as according to the first embodiment.

In this way, according to the second embodiment, the plurality of delay time tables TBL having different delay characteristics are provided in the data area of the ROM 14. The user can select the delay time table TBL to be used to generate the musical tone from among the delay time tables TBL. As a result, the relationship between the shelf board impulsive sound and the hammer string-striking sound can be simulated, and the tone variations of the acoustic piano can be actualized depending on the preference of the performer.

Furthermore, although the processing program of the electronic musical instrument which is a preferred embodiment of the present invention is stored in the memory (for example, ROM, etc.) of the electronic musical instrument, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. An electronic musical instrument comprising:

a delay time extracting means for storing a plurality of first delay times comprising a period that changes depending on a sounding volume and is a period after execution of a sound-producing instruction until generation of a string-striking sound and a plurality of second delay times comprising a period that changes depending on the sounding volume and is a period after execution of the sound-producing instruction until generation of a shelf board impulsive sound, and extracting a first delay time and a second delay time corresponding to a sounding volume specified by a sound-producing instruction operation from among the stored plurality of first delay times and second delay times; and a musical tone generating means for generating the string-striking sound having a pitch specified by the sound-producing instruction operation when the first delay time extracted by the delay time extracting means has elapsed after execution of the sound-producing instruction, generating the shelf board impulsive sound when the second delay time extracted by the delay time extracting means has elapsed, and generating a musical tone having a combination of the generated string-striking sound and the shelf board impulsive sound.

2. An electronic musical instrument comprising:

a delay characteristics storing means for storing a plurality of first delay times comprising a period that changes depending on a key-pressing strength and is a period after execution of a key press until generation of a string-striking sound and a plurality of second delay times comprising a period that changes depending on the key-pressing strength and is a period after pressing a key until generation of a shelf board impulsive sound;

an extracting means for extracting a first delay time and a second delay time corresponding to a key-pressing strength generated by a key-pressing operation from the delay characteristics storing means;

a string-striking sound generating means for generating the string-striking sound having a pitch depending on the key-pressing operation when the first delay time extracted by the extracting means has elapsed after pressing the key;

a shelf board impulsive sound generating means for generating the shelf board impulsive sound when the second delay time extracted by the extracting means has elapsed after pressing the key; and a musical tone generating means for generating a musical tone having added thereto the string-striking sound generated by the string-striking sound generating means and the shelf board impulsive sound generated by the shelf board impulsive sound generating means.

3. An electronic musical instrument comprising:

a delay characteristics storing means for storing a plurality of types of delay characteristics having a plurality of first delay times comprising a period that changes depending on a key-pressing strength and is a period after execution of a key press until generation of a string-striking sound and a plurality of second delay times comprising a period that changes depending on the key-pressing strength and is a period after pressing the key until generation of a shelf board impulsive sound;

a selecting means for selecting any of the plurality of types of delay characteristics stored in the delay characteristics storing means;

an extracting means for extracting a first delay time and a second delay time corresponding to a key-pressing strength generated by a key-pressing operation from the delay characteristics storing means within the delay characteristics selected from the delay characteristics storing means by the selecting means;

a string-striking sound generating means for generating the string-striking sound having a pitch depending on the key-pressing operation when the first delay time extracted by the extracting means has elapsed after pressing the key;

a shelf board impulsive sound generating means for generating the shelf board impulsive sound when the second delay time extracted by the extracting means has elapsed after pressing the key; and a musical tone generating means for generating a musical tone having added thereto the string-striking sound generated by the string-striking sound generating means and the shelf board impulsive sound generated by the shelf board impulsive sound generating means.

4. A computer program product for an electronic musical instrument stored on a computer-readable medium and executed by a computer, comprising the steps of:

a delay time extracting process for storing a plurality of first delay times comprising a period that changes depending on a sounding volume and is a period after execution of a sound-producing instruction until generation of a string-striking sound and a plurality of second delay times comprising a period that changes depending on the sounding volume and is a period after execution of the sound-producing instruction until generation of a shelf board impulsive sound, and extracting a first delay time and a second delay time corresponding to a sounding volume specified by a sound-producing instruction operation from among the stored plurality of first delay times and second delay times; and a musical tone generating process for generating the string-striking sound having a pitch specified by the sound-producing instruction operation when the first delay time extracted by the delay time extracting means has elapsed after execution of the sound-producing instruction, generating the shelf board impulsive sound when the second delay time extracted by the delay time extracting process has elapsed, and generating a musical tone having a combination of the generated string-striking sound and the shelf board impulsive sound.

5. A computer program product for an electronic musical instrument stored on a computer-readable medium and executed by a computer, comprising the steps of:

an extracting process for storing a plurality of first delay times comprising a period that changes depending on a key-pressing strength and is a period after is a period after execution of a key press until generation of a string-striking sound and a plurality of second delay times comprising a period that changes depending on the key-pressing strength and is a period after pressing a key until generation of a shelf board impulsive sound, and extracting a first delay time and a second delay time corresponding to a key-pressing strength generated by a key-pressing operation from among the stored plurality of first delay times and second delay times;

a string-striking sound generating process for generating the string-striking sound having a pitch depending on the key-pressing operation when the first delay time extracted by the extracting process has elapsed after pressing the key;

a shelf board impulsive sound generating process for generating the shelf board impulsive sound when the second delay time extracted by the extracting process has elapsed after pressing the key; and a musical tone generating process for generating a musical tone having added thereto the string-striking sound generated by the string-striking sound generating process and the shelf board impulsive sound generated by the shelf board impulsive sound generating process.

6. A computer program product for an electronic musical instrument stored on a computer-readable medium and executed by a computer, comprising the steps of:

a selecting process for storing a plurality of types of delay characteristics having a plurality of first delay times comprising a period that changes depending on a key-pressing strength and is a period after execution of a key press until generation of a string-striking sound and a plurality of second delay times comprising a period that changes depending on the key-pressing strength and is a period after pressing the key until generation of a shelf board impulsive sound, and selecting any of the plurality of types of delay characteristics;

an extracting process for extracting a first delay time and a second delay time corresponding to a key-pressing strength generated by a key-pressing operation from within the delay characteristics selected in the selecting process;

a string-striking sound generating process for generating the string-striking sound having a pitch depending on the key-pressing operation when the first delay time extracted by the extracting process has elapsed after pressing the key;

a shelf board impulsive sound generating process for generating the shelf board impulsive sound when the second delay time extracted by the extracting process has elapsed after pressing the key; and a musical tone generating process for generating a musical tone having added thereto the string-striking sound generated by the string-striking sound generating process and the shelf board impulsive sound generated by the shelf board impulsive sound generating process.

* * * * *